(12) United States Patent
Usami

(10) Patent No.: US 9,362,808 B2
(45) Date of Patent: Jun. 7, 2016

(54) METHOD OF MANUFACTURING ROTOR CORE OF ELECTRIC ROTATING MACHINE

(75) Inventor: Hiroaki Usami, Nagoya (JP)

(73) Assignee: DENSO CORPORATION, Kariya (JP)

( * ) Notice: Subject to any disclaimer, the term of this patent is extended or adjusted under 35 U.S.C. 154(b) by 965 days.

(21) Appl. No.: 13/409,838

(22) Filed: Mar. 1, 2012

(65) Prior Publication Data

US 2012/0223612 A1    Sep. 6, 2012

(30) Foreign Application Priority Data

Mar. 2, 2011    (JP) .................................. 2011-044865

(51) Int. Cl.
| | |
|---|---|
| *H02K 15/02* | (2006.01) |
| *B21J 5/06* | (2006.01) |
| *B21K 1/28* | (2006.01) |
| *H02K 1/24* | (2006.01) |

(52) U.S. Cl.
CPC .................. *H02K 15/022* (2013.01); *B21J 5/06* (2013.01); *B21K 1/28* (2013.01); *H02K 1/243* (2013.01); *Y10T 29/49012* (2015.01)

(58) Field of Classification Search
CPC ................ B21K 1/28; B21J 5/06; B21J 5/02; H02K 15/022; H02K 1/243; Y10T 29/49012
USPC ........ 72/377, 333, 334, 340, 355.4, 360, 356, 72/357; 29/598
See application file for complete search history.

(56) References Cited

U.S. PATENT DOCUMENTS

| | | | | |
|---|---|---|---|---|
| 4,558,511 | A * | 12/1985 | Kato ................................ | 72/377 |
| 4,759,117 | A | 7/1988 | Kato | |
| 5,016,340 | A * | 5/1991 | Kato ................................ | 72/377 |
| 7,047,787 | B2 * | 5/2006 | Kanemitsu et al. ........... | 72/355.4 |
| 2002/0138968 | A1 * | 10/2002 | Kato et al. ....................... | 29/598 |
| 2007/0132337 | A1 * | 6/2007 | Harada ........................... | 29/598 |

FOREIGN PATENT DOCUMENTS

| | | |
|---|---|---|
| JP | B-49-40068 | 10/1974 |
| JP | A-54-109102 | 8/1979 |
| JP | A-61-128749 | 6/1986 |

(Continued)

OTHER PUBLICATIONS

Office Action issued in Japanese Patent Application No. 2011-044865 dated Jul. 23, 2013 (with translation).

(Continued)

*Primary Examiner* — Alexander P Taousakis
*Assistant Examiner* — Mohammad I Yusef
(74) *Attorney, Agent, or Firm* — Oliff PLC

(57) ABSTRACT

The method of manufacturing a rotor core of an electric rotating machine includes a preliminary shaping step of forming a boss section having a cylindrical portion extending in an axial direction, a disk section extending from one end portion of the boss section in a radical direction and preliminary shape portions of claw sections extending from a periphery of the disk section in the axial direction, a boring step of forming an axial hole extending through the boss section in the axial direction, an ironing step of forming the claw sections, and a sizing step to achieve a necessary thickness and flatness of the boss section. The ironing step is performed with a mandrel having an interference with the axial hole smaller than a boring punch being inserted into the axial hole after completion of the boring step.

5 Claims, 8 Drawing Sheets

(56) References Cited

FOREIGN PATENT DOCUMENTS

| JP | A-62-100150 | 5/1987 |
| JP | A-6-143128 | 5/1994 |
| JP | B2-3609745 | 1/2005 |

OTHER PUBLICATIONS

Nov. 15, 2012 Japanese Office Action issued in Japanese Patent Application No. 2011-044865 (with Translation).

* cited by examiner

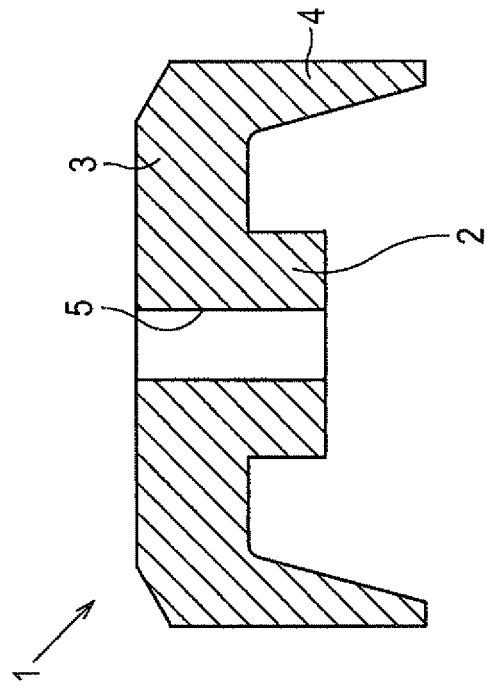
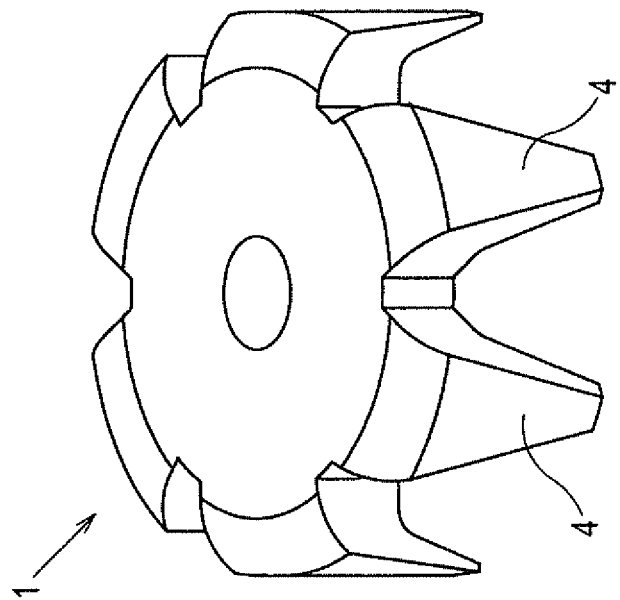

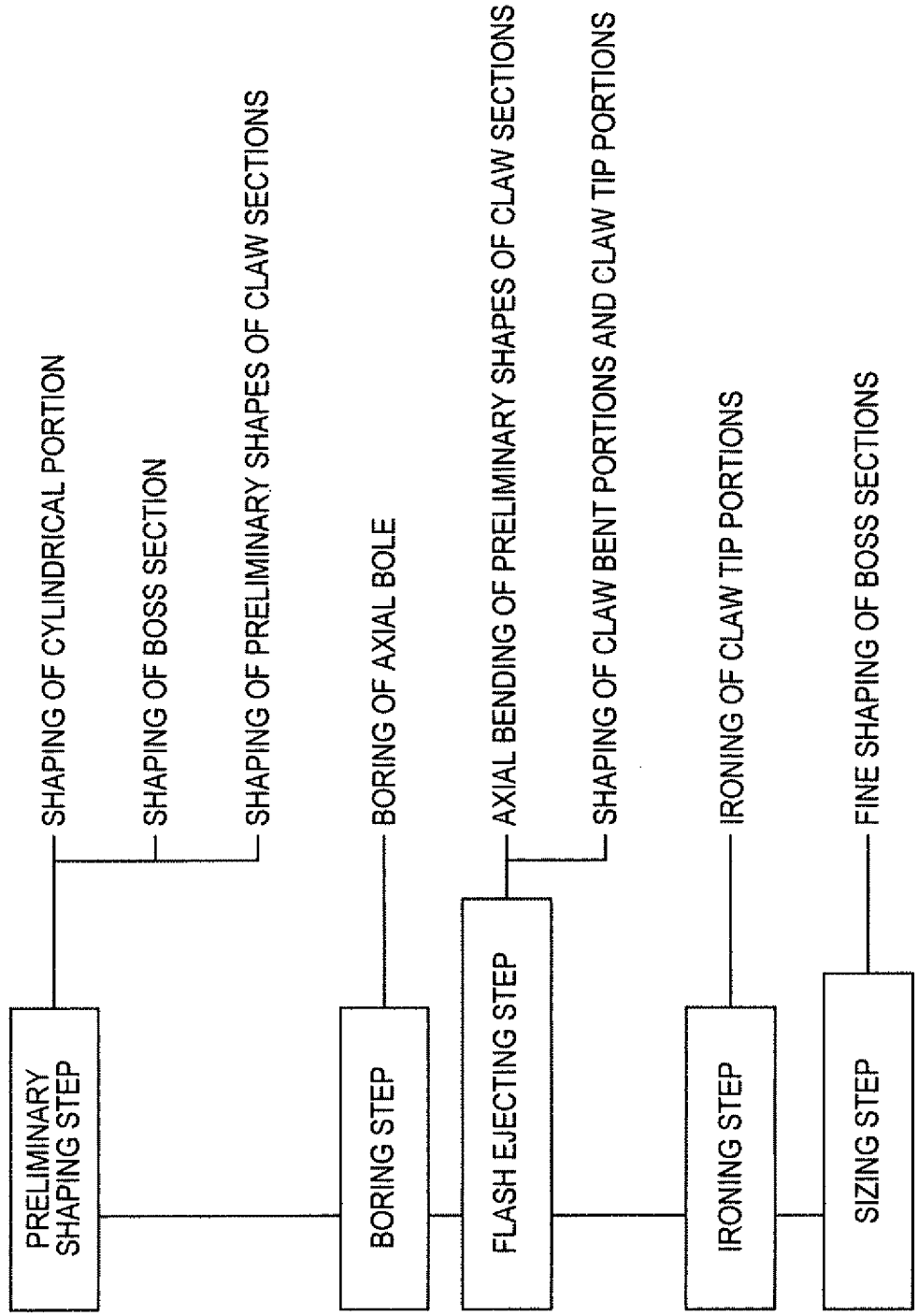

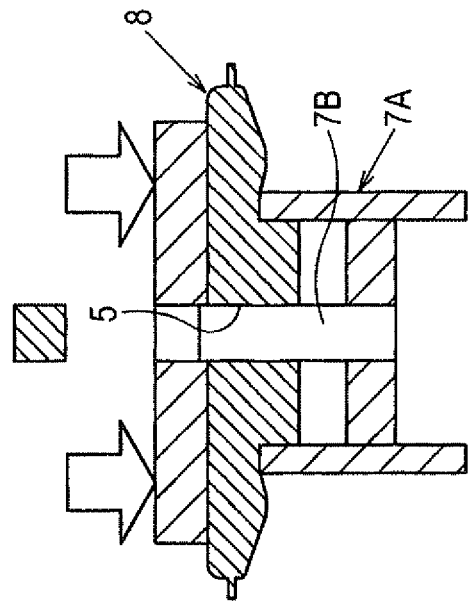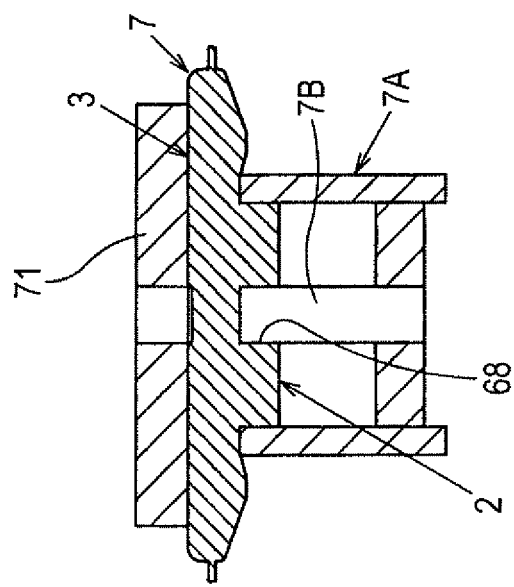

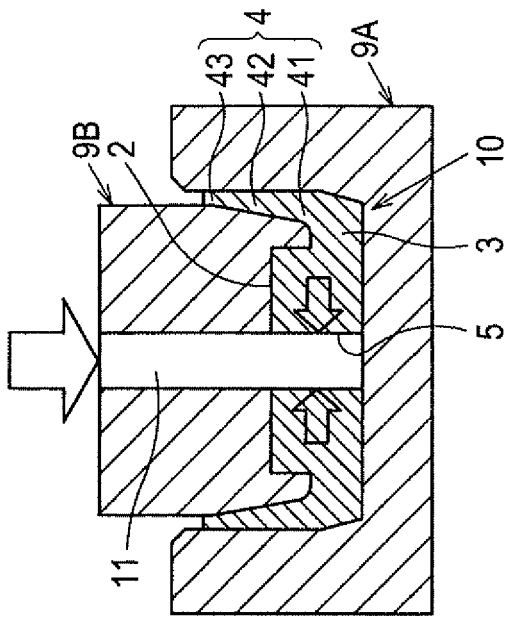
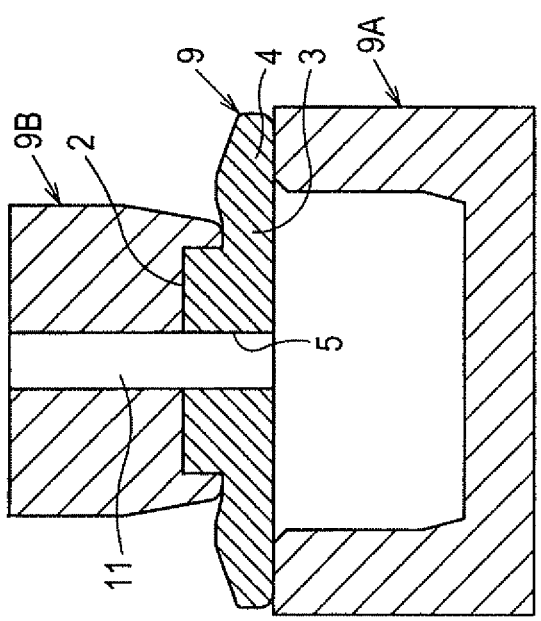

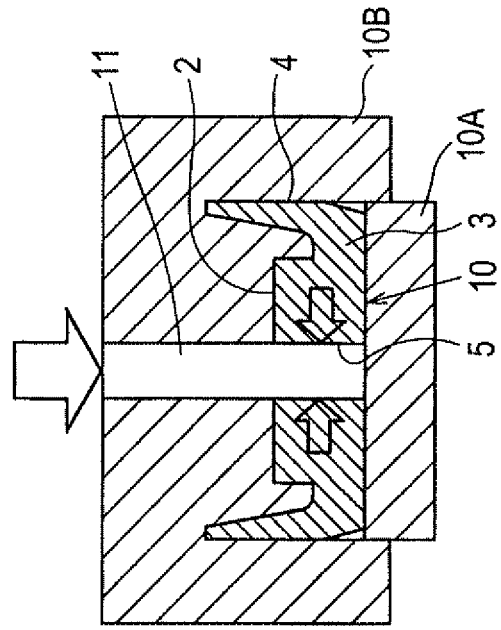
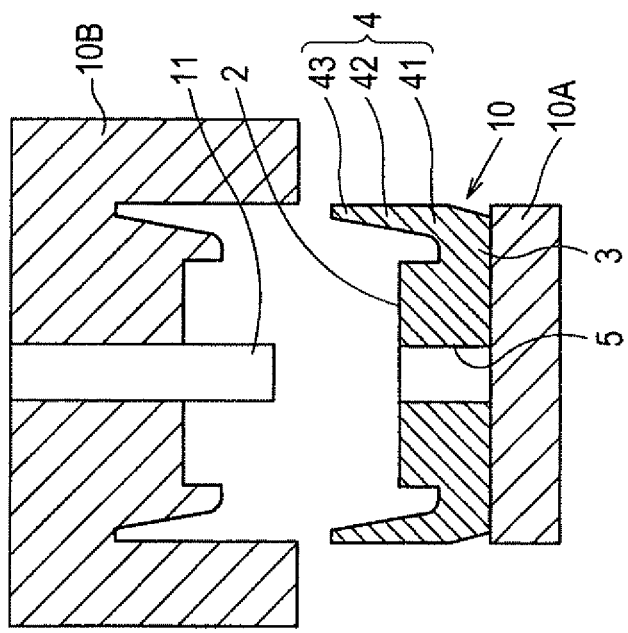

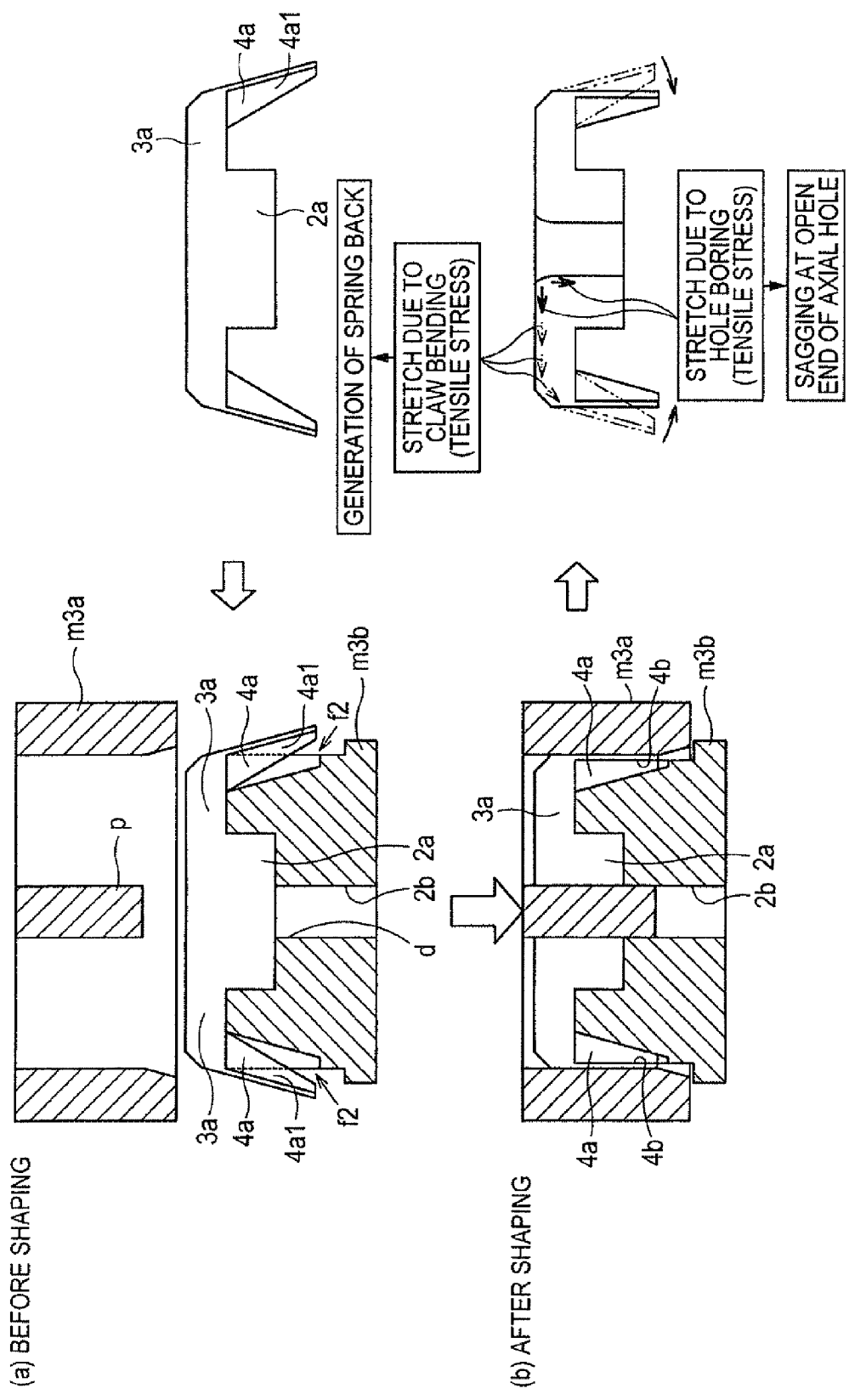

METHOD OF MANUFACTURING ROTOR CORE OF ELECTRIC ROTATING MACHINE

This application claims priority to Japanese Patent Application No. 2011-44865 filed on Mar. 2, 2011, the entire contents of which are hereby incorporated by reference.

BACKGROUND OF THE INVENTION

1. Field of the Invention

The present disclosure relates to a method of manufacturing a rotor core (pole core) having a plurality of claws of an electric rotating machine.

2. Description of Related Art

It is known to use, as a rotor of an electric rotating machine such as a vehicle-use alternator, a pair of pole cores each having a cylindrical boss section formed with an axial hole thereinside, a disk section radially extending from one end of the boss section, and a plurality of claw sections axially extending from the periphery of the disk section at equal intervals toward the other end of the disk section. Each adjacent two of the claw sections form a V-shaped channel reaching the outer periphery of the disk section.

The pair of the pole cores are disposed opposite to each other such that the claw sections of one pole core are located in the V-shaped channels of the other pole core with a certain clearance therebetween. A field coil is disposed between the disk sections and the claw sections, and a shaft is pressure-inserted into the axial bores to form a Lundell-type rotor core.

Such a pole core is manufactured by cold forging or hot forging in view of productivity, as shown, for example, in Japanese Patent No. 3609745. This patent document describes a method of manufacturing such a pole core as shown in FIG. 8, in which a boss section 2*a* is placed downward, an axial hole 2*b* is punched in the boss section 2*a* using a punch p of an upper mold m3*a* and a center die d of a lower mold m3*b*, and simultaneously with this, claw sections 4*a* are ironed to stretch while being bent until they form an angle of 90 degrees with a disk section 90 so that step portions 4*a*1 of the claw sections 4*a* are pressed against step portions f2 of the lower mold m3*b* and shaped into claw step portions 4*b*.

However, in this forging method, since the outer surfaces of the connecting portions between the claw sections 41 and the disk section 3*a* are extended while the claw sections 4*a* are bent and the axial hole 2*b* is formed, the surfaces of the disk section 3*a* are extended axially inward in the vicinity of the axial hole. As a result, since a residual bending stress forcing the disk section 3*a* to project outwardly remains, the claw sections 4*a* are likely to be displaced in the direction to increase the angle of the bend due to springback after the molds are removed. Further, since the diameter of the axial hole 2*b* increases on the side of the surface of the disk section 3*a* after the pole core is removed from the molds, the axial hole 2*b* is likely to have a tapered shape due to the difference between the diameter on the side of the surface of the disk section 3*a* and the diameter on the side of the end surface of the boss section 2*a*. In addition, the axial hole 2*b* is sags at its open end due to a tensile stress when the axial hole 2*b* is punched by the punch p.

As a result, the interference between the shaft and the axial hole 2*b* may become excessively large on the side of the end surface of the boss section 2*a*. In this case, it become difficult to pressure-insert the shaft into the axial hole 2*b*.

Further, when the interference is excessively small on the side of the disk section 3*a*, the fastening force between the shaft and the axial hole 2*b* occurs only at side of the disk section 3*a*, and the fastening force becomes inadequate. As a result, since the pole core easily vibrates with respect to the shaft due to deviation of the shaft from the rotating axis, magnetic attraction power and vibration of use environment, there occur adverse effects such as occurrence of magnetic nois, reduction of output power and reduction of lifetime of the rotor.

SUMMARY

An exemplary embodiment provides a method of manufacturing a rotor core of an electric rotating machine comprising:

a preliminary shaping step of pressing one end surface of a billet disposed on a die at the other end surface thereof by a punch to form a boss section having a cylindrical portion extending in an axial direction thereof, a disk section extending from one end portion of the boss section in a radial direction perpendicular to the axial direction, and preliminary shape portions of claw sections extending from a periphery of the disk section in the axial direction;

a boring step of pressing one end surface of the boss section disposed on a die at the other end surface thereof by a boring punch from one of the end surfaces of the boss section to form an axial hole extending through the boss section in the axial direction;

an ironing step of pressing outer sides of the preliminary shape portions of claw sections until the outer sides become parallel to the axial direction to thereby form claw base portions extending in the radial direction, claw bent portions bent in the axial direction from the claw base portions, and claw tip portions extending in the axial direction from the claw bent portions, the claw tip portions being formed to have a tapered shape in which a thickness thereof in the radial direction becomes smaller toward ends thereof; and a sizing step of pressing the end surface of the boss section and inner sides of the claw tip portions, the claw bent portions and the claw base portions in the axial direction to achieve a necessary thickness and flatness of the boss section, wherein the ironing step is performed with a mandrel having a smaller interference with the axial hole than the boring punch inserted into the axial hole after completion of the boring step.

According to the exemplary embodiment, there is provided a method of manufacturing a rotor core of an electric rotating machine capable of preventing the axial hole bored in the boss section of the rotor core from being affected by an internal stress generated in the disk section of the rotor core, and from having a tapered shape.

Other advantages and features of the invention will become apparent from the following description including the drawings and claims.

BRIEF DESCRIPTION OF THE DRAWINGS

In the accompanying drawings:

FIG. 1A is a perspective view of a rotor core (pole core) of an electric rotating machine, which is manufactured by a method of manufacturing a rotor core according to an embodiment of the invention;

FIG. 1B is a cross-sectional view of the rotor core;

FIG. 2 is a flowchart showing steps of the method of manufacturing a rotor core according to the embodiment;

FIGS. 4A and 4B are diagrams for explaining a boring step included in the method of manufacturing a rotor core according to the embodiment;

FIGS. 6A and 6B are diagrams for explaining an ironing step included in the method of manufacturing a rotor core according to the embodiment;

FIGS. 7A and 7B are diagrams for explaining a sizing step included in the method of manufacturing a rotor core according to the embodiment; and FIG. 8 is a diagram explaining a conventional pole-core ironing step.

PREFERRED EMBODIMENTS OF THE INVENTION

Figure 3A:
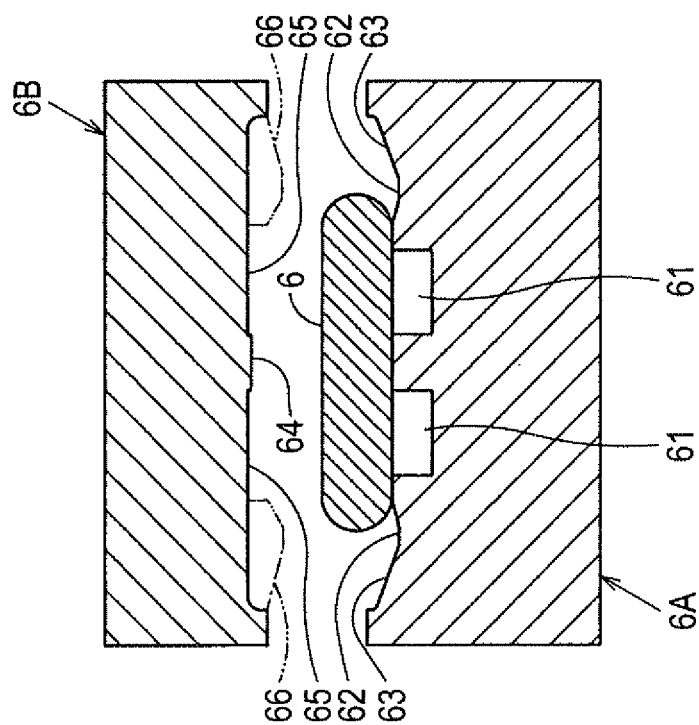
FIGS. 3A and 3B are diagrams for explaining a preliminary shaping step included in the method of manufacturing a rotor core according to the embodiment.

FIG. 1A is a perspective view of a rotor core (referred to as pole core hereinafter) 1 of an electric rotating machine, which is manufactured by a method of manufacturing a rotor core according to an embodiment of the invention. A Lundell-type rotor core is formed by assembling two pole cores 1 disposed opposite to each other, a field coil and a shaft. The pole core 1 includes a cylindrical boss section 2 and a disk section 3 radially extending from one end of the boss section 2. The disk section 3 has a plurality of claw sections 4 extending from the periphery of the disk section 3 toward the other end of the boss section 2, each claw section 4 serving as a claw shaped-magnetic pole. The boss section 2 is formed with an axial hole 5 in which a shaft is fitted.

As shown in FIG. 2, the pole core 1 is manufactured by a method including:

(a) a preliminary shaping step of shaping a cylindrical portion to be formed with the axial hole of the boss section 2, and preliminary shape portions of the claw sections 4;
(b) a boring step of boring the axial hole through the cylindrical portion;
(c) a flash ejecting step of bending the claw portions in the axial direction to form bent portions and claw tip portions;
(d) an ironing step of ironing out the claw tip portions to have a tapered shape; and
(e) a sizing step of finely shaping the above portions to achieve a necessary thickness and a necessary flatness of the boss section.

Figure 3B:
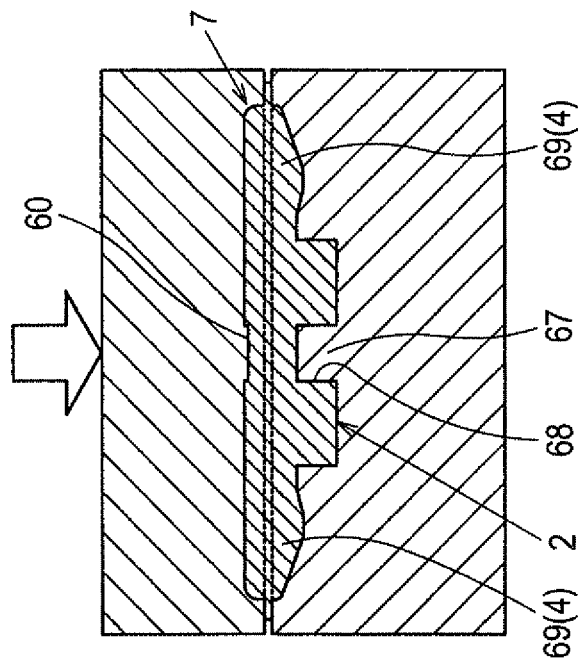

Next, the above steps are explained with reference FIGS. 3A and 3B to FIGS. 7A and 7B. FIGS. 3A and 3B are diagrams for explaining the preliminary shaping step. As show in FIG. 3A, a disk-shaped billet 6 is disposed on a die GA formed with a circular groove 61, a circular dish-shaped recess 62 located outside the circular groove 61, and a plurality of claw recesses 63 located at equal intervals outside the circular dish-shaped recess 62. Thereafter, the billet 6 is pressed by a punch 6B including a circular salient 64 formed in its center, a circular recess 65 located outside the circular salient 64 and a plurality of claw recesses 66 formed corresponding to the plurality of claw recesses 63.

As a result, as shown in FIG. 3B, there is formed the cylindrical portion 68 of the boss section 2 including a column-shaped recess 67 to be formed with the axial hole 5 located at its lower surface. At this time, the preliminary shape portions 69 of the claw sections 4 to be arranged radially along the periphery of the boss section 2 is formed. Further, the billet 6 is formed with a shallow circular recess 60 at its upper surface to complete a primary preliminary forged item 7.

FIGS. 4A and 43 are diagrams for explaining the boring step. The end surface of the primary preliminary forged item 7 on the side of the boss section 2 is placed on a die 7A. In this state, the cylindrical portion 68 is punched by a punch 7B from the side of the boss section 2 to form the axial hole 5 to complete a secondary preliminary forged item 8.

Figure 5A:
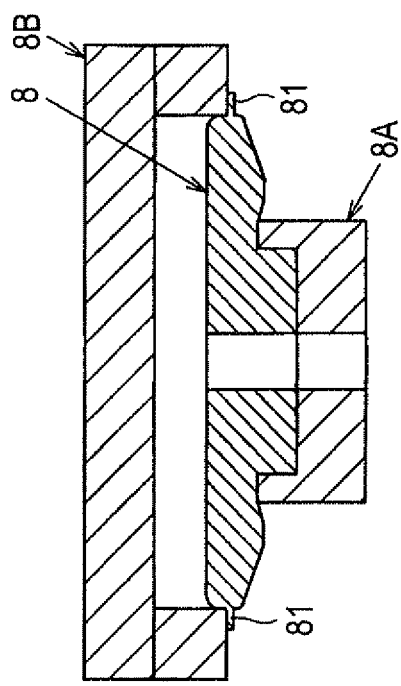
FIGS. 5A and 5B are diagrams for explaining a flash ejecting step included in the method of manufacturing a rotor core according to the embodiment.
Figure 5B:
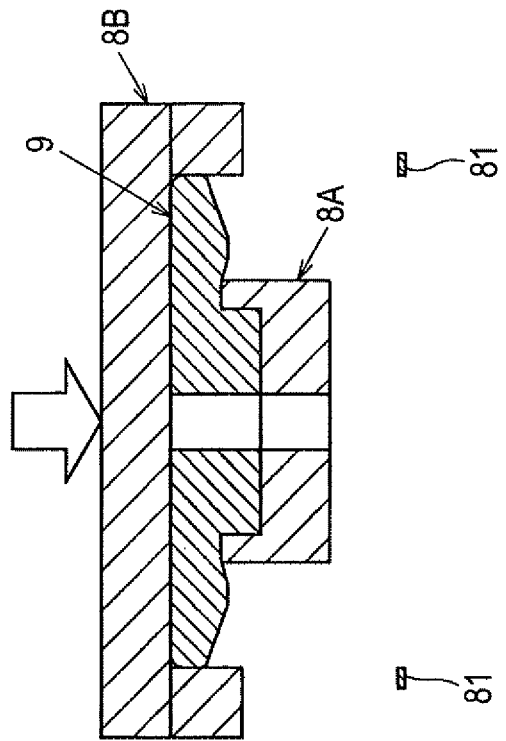

FIGS. 5A and 5B are diagrams for explaining the flash ejecting step. The secondary preliminary forged item 8 is placed on a die 8A, and peripheral burrs are cut to complete a tertiary preliminary forged item 9.

FIGS. 6A and 6B are diagrams for explaining the ironing step. The tertiary preliminary forged item 9 is pressed at the end surface of the boss section 2 and the outer sides of the claw sections 4 continuing to the core outer surface of the disk section 3 using a die 9A and a punch 9B. As a result, the claw sections 4 are bent such that the outer sides of the claw sections 4 are parallel to the axial direction. Thereafter, there are formed claw bent portions 42 bent in the axial direction from claw base portions 41 and claw tip portions 43 extending in the axial direction. Further, the claw tip portions 43 are taper-shaped so that their thicknesses become smaller toward their ends to complete a quaternary preliminary forged item 10.

FIGS. 7A and 7B are diagrams for explaining the sizing step. The quaternary preliminary forged item 10 is shaped by pressing the end surface of the boss section 2, and inner sides of the claw tip portions 43, the claw bent portions 42 and the claw base portions 41 in the axial direction using a die 10A and punch B so that the boss section has a necessary thickness and a necessary flatness.

In this embodiment, the boring step and the ironing step are not performed at the same time. That is, in this embodiment, the punch 7B is removed after completion of the boring step, and then the ironing step is performed with a mandrel 11 having a smaller interference with the axial hole 5 than the punch 7B being inserted into the axial hole 5. This makes it possible to prevent a stress generated in the disk section 3 during bending of the claw sections 4 from affecting the axial hole 5. Accordingly, according to this embodiment, it is possible to prevent the axial hole 5 from being deformed by increase of the diameter of the axial hole 5 on the side of the surface of the disk section 3.

Further, the mandrel 11 having the same diameter as the axial hole 5 is inserted into the axial hole 5 before performing the shaping to prevent deformation of the axial hole 5. This makes it possible that, when the inner periphery of the axial hole 5 expands causing the inner diameter to decrease, and the mandrel 11 is inserted into the axial hole 5 during or after the shaping, the forged item is broken due to interference between the mandrel 11 and an expanded portion of the axial hole 5.

The mandrel 11 is inserted into the axial hole 5 in the direction from end surface of the boss section 2 to the disk section 3. This makes it possible to dispose the mandrel 11 for tying the inner periphery of the axial hole 5 and a tying member for tying the outer periphery of the boss section 2 on the same side in the axial direction with respect to an item to be forged. Accordingly, according to this embodiment, since the mandrel 11 and the tying member can be disposed on the same side with respect to the upper and lower molds, it is possible to prevent biased wear and breakage of an item to be forged due to positional deviation between the mandrel 11 and the axial hole 5 compared to a case where the mandrel 11 and the tying member are disposed separately with respect to the upper and lower molds.

In the ironing step, the surface of the disk section 3 of the pole core 1 is pressed to counteract the force in the axial direction applied in each step. This makes it possible to restrict the surface of the disk section 3 from being bent convexly in the axial direction when the claw sections 4 are bent.

Since the use of the mandrel 11 increases shaping accuracy, it is not necessary to perform cutting work of the inner periphery of the axial hole 5. Since the material is work-hardened in the vicinity of the inner periphery of the axial hole, and not machine-cut, the material hardness of the inner periphery of the axial hole is higher than that of the inside of the core. The inner periphery of the axial hole 5 has no grain in the circumferential direction, and has a high hardness. Accordingly, material gouge in the inner surface of the axial hole 5 when the shaft is pressure-inserted into the axial hole 5 can be reduced. As a result, reduction of the fastening strength when the interference between the shaft and the axial hole is small, and scoring due to gouge burr can be suppressed.

In this embodiment, the above five steps are performed in order to manufacture a pole core. However, the boring step and the flash ejecting step may be performed at the same time, so that two of the five steps are performed in one pressing operation to increase the productivity.

In the sizing step, correction of the claw sections 4 by pressing the outer sides of the claw tip portions 43 toward the radially inner side, and chamfering of the claw sections 4 may be performed at the same time, so that shaping accuracy of the claw sections 4 can be increased. In the boring step, the axial hole may be formed by pressing the punch 7B from the side of the disk section 3.

According to the manufacturing method of the present invention, since bending of the claw sections 4 and boring of the axial hole 5 are not performed at the same time, it is possible to prevent the axial hole from being affected by an internal stress of the disk section 3 and from having a tapered shape. Further, since the mandrel 11 having the same diameter as the axial hole 5 is inserted into the axial hole 5, accuracy of the size and shape, and the material hardness can be made high. This makes it possible to fit a pole core and a shaft with each other smoothly and reliably.

The above explained preferred embodiments are exemplary of the invention of the present application which is described solely by the claims appended below. It should be understood that modifications of the preferred embodiments may be made as would occur to one of skill in the art.

What is claimed is:

1. A method of manufacturing a rotor core of an electric rotating machine comprising:
    a preliminary shaping step of pressing one end surface of a billet disposed on a preliminary die at the other end surface thereof by a preliminary punch to form a boss section having a cylindrical portion extending in an axial direction thereof, a disk section extending from one end portion of the boss section in a radial direction perpendicular to the axial direction, and preliminary shape portions of claw sections extending from a periphery of the disk section in the axial direction;
    a boring step of pressing the boss section by a boring punch in a direction from the boss section to the disk section to form an axial hole extending through the boss section in the axial direction;
    an ironing step of pressing outer sides of the preliminary shape portions of claw sections in a state in which the boss section is sandwiched and pressed between an ironing punch and an ironing die until the outer sides become parallel to the axial direction to thereby form claw base portions extending in the radial direction, claw bent portions bent in the axial direction from the claw base portions, and claw tip portions extending in the axial direction from the claw bent portions, the claw tip portions being formed to have a tapered shape in which a thickness thereof in the radial direction becomes smaller toward ends thereof; and
    a sizing step of pressing the end surface of the boss section and inner sides of the claw tip portions, the claw bent portions and the claw base portions in the axial direction to achieve a necessary thickness and flatness of the boss section,
    wherein the ironing step is performed after completion of the boring step with a mandrel having been inserted into the axial hole in the direction from the side of the boss section to the side of the disk section, an interference between the mandrel and the axial hole being smaller than an interference between the boring punch and the axial hole.

2. The method according to claim 1, wherein the mandrel inserted into the axial hole before performing the ironing step has a diameter equal to a diameter of the axial hole.

3. The method according to claim 1, wherein, in the ironing step, the outer surface of the disk section is pressed to counteract a force applied in the axial direction during the ironing step.

4. The method according to claim 1, wherein a flash ejecting step of ejecting burrs in outer peripheries of the claw sections is performed simultaneously with the boring step.

5. The method according to claim 1, wherein, in the sizing step, the claw tip portions are shape-corrected by being pressed inwardly in the radial direction at outer surfaces thereof, and chamfered.

* * * * *